Figure 1:
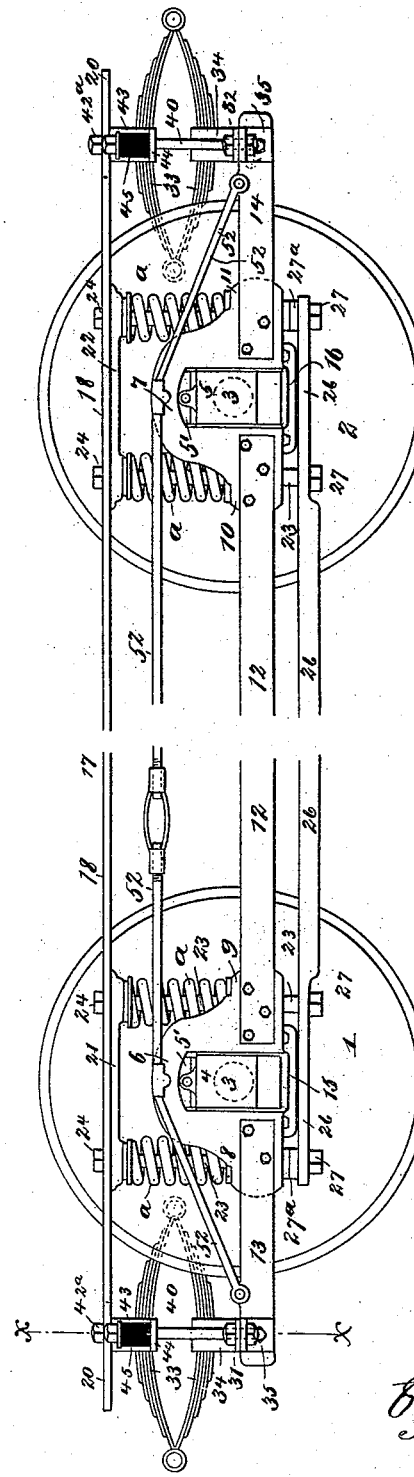

(No Model.)
2 Sheets—Sheet 1.

G. M. & J. A. BRILL.
CAR TRUCK.

No. 494,117.
Patented Mar. 28, 1893.

Attest:
C. H. Benjamin.
H. F. Dunbar.

Inventor
George Martin Brill,
John A. Brill
by Joseph L. Levy
Atty (No Model.) 2 Sheets—Sheet 2.
G. M. & J. A. BRILL.
CAR TRUCK.
No. 494,117. Patented Mar. 28, 1893.
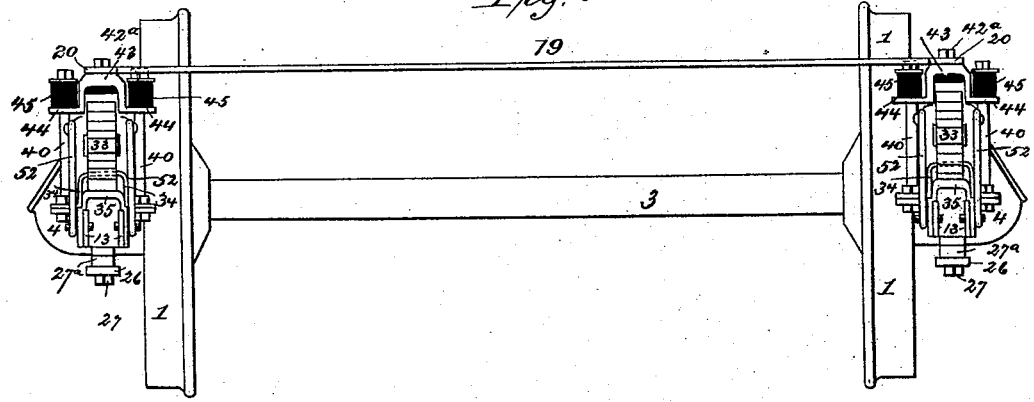
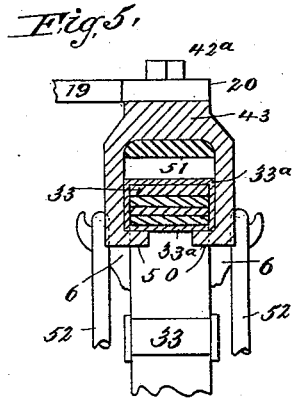
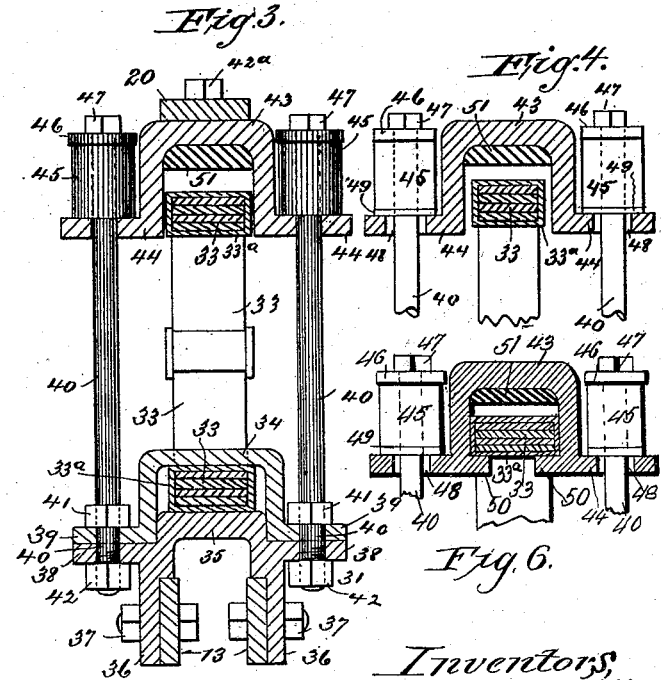
Attest:
C. H. Benjamin.
H. F. Durban
Inventors
George Martin Brill.
John A. Brill
by Joseph L. Levy
atty

UNITED STATES PATENT OFFICE.

GEORGE MARTIN BRILL AND JOHN A. BRILL, OF PHILADELPHIA, PENNSYLVANIA.

CAR-TRUCK.

SPECIFICATION forming part of Letters Patent No. 494,117, dated March 28, 1893.

Application filed June 30, 1892. Serial No. 438,508. (No model.)

*To all whom it may concern:*

Be it known that we, GEORGE MARTIN BRILL and JOHN A. BRILL, both citizens of the United States of America, residing at Philadelphia, county of Philadelphia, State of Pennsylvania, have invented certain new and useful Improvements in Car-Trucks, of which the following is a specification.

Our invention relates to the application of what is known as an extended spring base to trucks for cars.

The present invention relates to specific improvements on the car truck shown and described in our application filed June 26, 1891, Serial No. 397,563, to which cross reference is here made.

The main object of the invention of the before stated application was to enable a truck of comparatively short wheel base to be used, and to support a car body upon it, the ends of which overhang the ends of the truck for some distance; and also to overcome, in a measure, the end vibration or oscillation of the car body and movable portion of the truck.

The specific improvements herein set forth have for their object to check or restrain the undue compression of the elliptical springs at one end of the truck and the undue elevation of the truck or car body at the other, which is caused by the oscillation of the car body, the springs at either end acting as buffers. To this end we supplement the elliptical springs with others, which are adapted to come into play when one end of the car is unduly elevated, but which in no wise interfere with the normal movement of the car body on its supporting springs. A modification of this consists in utilizing the elliptical springs themselves for this purpose.

Another feature of the present improvements consists in locating an elastic cushion between the car body or truck frame and the elliptical springs, by which the impact of these parts is absorbed and deadened.

An embodiment of our invention is shown and described herein, and further pointed out in the claims.

In the drawings Figure 1 is a side elevation of a car truck, showing my improvements applied thereto; Fig. 2, an end elevation of the same from either end; Fig. 3, an enlarged vertical section, taken approximately on the line *x x*, Fig. 1, the axle boxes and saddles being removed; Fig. 4, a like view of the upper part of Fig. 3, slightly modified; Fig. 5, a section through the upper spring cap, and upper section of the elliptical spring showing a modification; Fig. 6, a like view showing a combination of the forms shown in Figs. 3 and 5.

Similar numerals of reference refer to like parts throughout the several views.

We will proceed to describe the structure generally before setting forth our particular improvements thereon.

In the drawings 1 and 2 are the wheels, 3 the axles (but one is shown in full), and 4, 5 the axle boxes.

At 6, 7 are saddles supported on the axle boxes either rigidly, flexibly, or in such a manner as to be capable of a movement in the line of the axle. We, however, prefer the method shown in Fig. 1, in which an elastic cushion 5' is placed between the saddles and axle boxes to deaden the shock of the wheels against the saddles and to yieldingly support the axle box frame, of any desired construction, on the axle boxes. The saddles are provided with extensions 8, 9, 10, 11, which provide seats for what we have termed the axle box springs *a*. The central longitudinal sections 12 of the side beams (in this case composed of two juxtaposed bars set on edge) are secured at their ends to the seats 9, 10 of the axle box saddles at each side thereof, and the outwardly extending sections, which form the base or bed of the extended spring base, are formed of the sections 13, 14, the ends of which are secured to the seats 8, 11 of the saddles on both sides thereof. These extensions 13, 14 extend some distance out from the axle boxes, in fact, to an extent much greater than that ordinarily resorted to. The lower ends of the saddles are united by cross-bars 15, 16 bolted or otherwise secured thereto, extending across the opening therein. The side beams are usually united laterally to form an integral frame, termed an axle box frame, and this construction we prefer, although this lateral union does not enter into the present invention to any material extent, so we have not shown them as united, it being only necessary to provide an efficient support for the springs.

The class of truck to which our present improvements are applied is to be distinguished from trucks of the ordinary structure, by reason of the fact that it comprises two distinct parts: one part (apart from the running gear) the side beams or axle box frame, and another part comprising the upper chord or car sill, and pedestals with or without bracing for the same. The first we shall term the stationary frame (although it is not stationary in the true sense of the word, because there is a play of the axles in the boxes, and there may be a movement of the side beams), because it is not affected by the movement of the car body to any appreciable extent; and the other, the movable frame or portion of the structure, for the reason that it partakes of the up and down movement of the car body and all its movements on its supporting springs.

The upper chord (or car sill) upon which the body of the car rests is shown at 17. It is rectangular in form, preferably, and has longitudinal side sections 18 and lateral end sections 19. It may be formed or constructed in the usual manner, and is provided with extensions 20. Spring plates 21, 22 are secured to the upper chord in any desirable manner.

At 23 are spring posts which extend downwardly through the seats of the saddles and upwardly through the spring plates, and are held to the upper chord by the nuts 24. The axle box springs $a$, which surround the spring posts, find seats at one end in the spring plates 21, 22, and at their lower ends on the seats of the axle box saddles.

At 26 is the pedestal tie bar uniting the ends of the spring posts on one side of the truck, it being secured thereto by the nuts 27. A block of metal or of rubber $27^a$ may be inserted between the seats 8, 11 and the pedestal tie bar to deaden the shock due to the upward movement of the posts and tie bar.

The foregoing parts comprise what we term the movable portion of the structure.

As before stated, the upper chord is extended outwardly from the axles to a more than ordinary degree, and this is done for the purpose of giving a firm bottom for the car body and a greater carrying capacity for the truck; it is therefore clear that more than the ordinary load is intended to be carried on this structure, and for this reason more than ordinary devices for spring supporting the car body are necessary. To this end we supplement the axle box springs by placing elliptical springs of slower action or lesser carrying capacity between the extended portions or sections of the side beams and upper chord, and so arrange them in respect to each other, that the elliptical springs will not come into play until after the axle box springs have begun to compress, and the action of the spirals in lifting the car body is continued after the elliptical springs have ceased to act. The devices, which secure the elliptical springs between the side beams and the upper chord, permit one end of the chord to approach the side beams and the other end to be elevated, as will occur during the act of oscillation, one set of elliptical springs being compressed, while the other remains in its normal condition.

The devices for securing the supplemental or elliptical springs to the truck and those for checking the oscillation thereof will now be described.

Near the outer ends of the sections 13, 14 of the side beams we locate straps 31, 32, in which the elliptical springs 33 (constructed in any desired manner) are secured. The construction of these straps is best seen in Fig. 3. They are composed of two superposed saddles 34, 35, the saddle 35 having legs 36 which straddle the side beams, to which they are secured by the nuts 37, and upon which the spring 33 rests. These also have ears 38, and upon these ears rest ears 39 formed on the saddle 34 which embraces the spring and secures it down upon the saddle 35. The ears of both saddles are held together by the pillars 40 which pass through them, they being screw threaded to receive the nuts 41, 42 which bind the ears together.

The method of securing the springs 33 to the upper chord or car sill permits a certain amount of downward movement of the car before the spring is compressed, and an upward movement of the car after the spring has relaxed. To the devices used for this purpose are added others which restrain the oscillation, as before set forth.

To the upper chord is secured by the bolt $42^a$ a cap 43, having outwardly extending ears 44. The cap is saddle shaped and the upper lamina of the spring 33 is guided therein, the strap $33^a$ which holds the laminæ of the spring together preferably bearing against the vertical walls of the cap. Rubber or other elastic cushions 45 are seated on the ears 44, and the pillars 40 pass through holes in ears and through the cushions 45, and on top of the cushions rest plates 46, through which the pillars pass. The pillars are provided with nuts 47 which normally bear on top of the plates 46, and by these nuts the extent of upward movement of the upper chord can be regulated, such movement being determined by their position on the pillars 40.

In cases where the side beams of the axle box frame are bolted dead onto the axle boxes, that is, where they do not change their position, longitudinally, to the upper chord of the truck or car sills, then this arrangement will be sufficient to accomplish the desired end; but in cases where the side beams are swung from the axle boxes in such a way as to permit a movement of either the car, axle, or axle box frame, all independent of each other, and transverse of the truck, then it is desirable that a certain range of motion, transversely, can be had between the upper and lower supports for the elliptical spring. This is accomplished by enlarging the holes in the ears 44, through which the pillars pass, as shown at 48, Fig. 4. This will permit either the upper chord or car sill, to which the cap 43 is secured, or the saddles and pillars on the side beams to move transversely of the truck independently of each other. In this case the cap 43 would preferably be made interiorly wider than the spring, so that a movement of such spring can be had therein. The cushion 45 could then rest on a plate 49, which in turn rests on the ears 44, and through which the pillars 40 pass.

The foregoing structure permits the car body to rise and fall on its supporting springs, without bringing into play the auxiliary springs; while at the same time said auxiliary springs will restrain any undue upward movement of the cap 43, it being limited by the compression of the cushions 45.

A modification (in structure but not in result) is shown in Fig. 5, in which the cap 43 is shown with lips or flanges 50 extending inwardly therefrom, and upon which the elliptical spring rests. This permits the descent of the bar body for spring compression purposes, and any movement of the car body upwardly in excess of the normal relaxation of the supporting spring is checked by the lips 50 coming in contact with the elliptical spring and distending it. The ears 44 not being necessary to this modification are eliminated. An elastic cushion or block 51 is secured to the under side of the cap 43, so as to come into contact with the spring 33 and to deaden and act simultaneously with and as an auxiliary spring to said elliptical spring 33, and also helping to absorb the shock of the contact of these parts. A brace 52 is shown extending between the outer sections of the side beams and resting on the axle box saddles, which braces said outer sections and prevents the saddles from becoming fractured or the side beams from being distorted. As this forms part of the application hereinbefore mentioned, we do not claim it herein.

We claim—

1. In a truck, the combination of a stationary frame supported on the running gear, a movable frame, a series of sets of springs of varying capacity for the movable frame, and an additional set of springs auxiliary to one set of the series substantially as described.

2. In a truck, the combination of a stationary frame supported on the running gear, a movable frame, sets of springs for said movable frame, whereof one set acts continuously thereon and another set is supplemental to the first set, coming into operation after commencement of compression of the first set, and an auxiliary set of springs acting simultaneously with the supplemental set, substantially as described.

3. In a truck, the combination with a stationary frame supported on the running gear, said frame having sections extending outwardly from the axle, a movable frame, spiral springs between the movable and stationary frames, elliptical springs between the extended sections and the movable frame, and an additional set of springs auxiliary to the elliptical springs, substantially as described.

4. In a truck, the combination of a stationary frame, supported on the running gear, a movable frame, a set of springs $a$ connected to both frames, a supplemental set 33 connected to one frame, and a set of springs 51 connected to the other frame, auxiliary to the supplemental set, substantially as described.

5. In a truck, a spring supporting frame having outwardly extending sections, a movable frame having like extensions, spiral springs about the running gear and extending between both frames, elliptical springs between the extensions of both frames, and elastic cushions in combination with and auxiliary to the elliptics and located adjacent thereto, substantially as described.

6. A truck having running gear and a frame, spiral springs for supporting the car body supplemented by elliptical springs adapted to coact therewith, and auxiliary springs, acting independently of the elliptical springs, opposing a resilient resistance to the upward movement only of said frame, substantially as described.

7. A truck having running gear and a frame, springs adapted to support said frame, and elastic cushions independent of said springs opposing a resilient resistance to the upward movement only of the frame, the cushions at one end co-acting with the springs at the other to resist the said movement, substantially as described.

8. A truck having running gear and a frame, springs adapted to support said frame, supports for said springs, devices secured to said frame for confining the upper portion of the springs and connections between said devices and the spring supports, said devices and connections being constituted so as to permit a transverse movement of either of the springs or the frame independently of each other, substantially as described.

9. The combination with the side beams, the superposed saddles secured to the side beams, a spring held between the saddles, a cap secured to the upper chord or car sill engaging the upper end of the said spring, pillars extending between the saddles and cap, and elastic cushions on said cap engaging the pillars, substantially as described.

10. The upper chord or car sill having the depending cap 43, outwardly extending ears 44 on said cap, elastic cushions 45 on said ears, an elliptical spring held on the side beams adapted to move in said cap, and pillars 40 secured to the side beams and passing through and bearing on said cushions, substantially as described.

11. The upper chord or car sill having the depending cap 43, ears 44, extended openings 48 in said ears, elastic cushions 45 on said ears, pillars 40 passing through the opening 48 and cushions and bearings on said cushions, and a spring 33 extending within the cap which is wider than engaging end of the spring, substantially as described.

12. The combination with the side beam, a spring secured to the side beams, a cap secured to the upper chord or car sill straddling the upper portion of the spring, an elastic support on said cap, and devices connecting the side beam with the elastic support, substantially as described.

13. The upper chord or car body having the depending yoke shaped cap 43 with the inwardly extending lips 50, and the elliptical spring 33 held in said cap and adapted to move therein, substantially as described.

14. The upper chord or car body having the depending yoke shaped cap 43 with the inwardly extending lips 50, a spring 33 adapted to bear on said lips and move in the cap, substantially as described.

15. The upper chord or car body having the depending cap 43, lips 50 on said cap, and a spring 33 suitably supported and having the binding strap 33ª in contact with the lips, substantially as described.

16. The upper chord or car body having the depending cap 43, a spring suitably supported and adapted to move in said cap, and an elastic cushion between the spring and cap, substantially as described.

17. The upper chord or car body, the yoke shaped cap 43 having the lips 50, an elastic block 51 set in the upper portion of the cap, and an elliptical spring suitably supported and adapted to move in said cap, substantially as described.

18. The upper chord or car body, having a depending yoke-shaped cap with laterally projecting lips thereon, said lips adapted to engage a spring opposing a resilient resistance to the upward movement of said chord, substantially as described.

19. In a truck, the combination of a stationary frame supported on the running gear, a movable frame, a yoke-shaped cap secured thereto, laterally projecting lips on the cap, and a spring connected to the stationary frame and engaging said lips, substantially as described.

20. In a truck, the combination, with a stationary frame supported on the running gear, of a movable frame and springs 33, 45 secured to the stationary frame, each adapted to commence a resilient resistance to the movable frame, one after said frame has commenced its downward movement and the other after it has commenced its upward movement, substantially as described.

21. In a truck, the combination, with a stationary frame supported on the running gear, of a movable frame, and elastic cushions 45, 51, attached one to each frame, and resiliently resisting respectively the upward and the downward movement only of the movable frame, substantially as described.

22. In a truck, the combination of a stationary frame, a movable frame, a spring secured to the stationary frame, a yoke-shaped cap secured to the movable frame and embracing the spring, and an elastic cushion secured in said cap, and arranged to contact with said spring, substantially as described.

23. In a truck, the combination, with a stationary frame, of a movable frame, a spring secured to the stationary frame, a saddle secured to the movable frame, an elastic cushion secured to said saddle and adapted to contact with the spring, and an elastic cushion connected to the stationary frame, and contacting with the saddle, substantially as described.

24. In a truck, the combination of a stationary frame supported on the running gear, a movable frame, a yoke-shaped cap secured to said movable frame straddling an attachment of the stationary frame, and an elastic cushion secured within the yoke of said cap, and adapted to contact with said attachment, substantially as described.

25. The combination of the saddles 34, 35 the elliptical spring 33 secured therein, the upper saddle or cap 43 arranged to compress said spring, and the posts 40, serving as bolts for the lower saddles, and as guides for the upper saddle, substantially as described.

Signed at the city of Philadelphia, county of Philadelphia, and State of Pennsylvania, this 27th day of June, 1892.

GEORGE MARTIN BRILL.
JOHN A. BRILL.

Witnesses:
HENRY C. ESLING,
WM. H. HEULINGS, Jr.